(12) United States Patent
Sevastopolskiy et al.

(10) Patent No.: US 12,229,880 B2
(45) Date of Patent: *Feb. 18, 2025

(54) METHOD FOR RENDERING RELIGHTED 3D PORTRAIT OF PERSON AND COMPUTING DEVICE FOR THE SAME (71) Applicant: SAMSUNG ELECTRONICS CO., LTD., Suwon-si (KR)

(72) Inventors: Artem Mikhailovich Sevastopolskiy, Moscow (RU); Victor Sergeevich Lempitsky, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,716

(22) Filed: Nov. 20, 2023

(65) Prior Publication Data

US 2024/0096011 A1 Mar. 21, 2024

Related U.S. Application Data

(63) Continuation of application No. 17/457,078, filed on Dec. 1, 2021, now Pat. No. 11,823,327, which is a
(Continued)

(30) Foreign Application Priority Data

Nov. 19, 2020 (RU) ................................ 2020137990
Feb. 19, 2021 (RU) ................................ 2021104328

(51) Int. Cl.
*G06T 15/60* (2006.01)
*G06F 18/214* (2023.01)
(Continued)

(52) U.S. Cl.
CPC .......... *G06T 15/60* (2013.01); *G06F 18/2148* (2023.01); *G06N 3/084* (2013.01);
(Continued)

(58) Field of Classification Search
CPC ......... G06T 15/60; G06T 7/194; G06T 15/04; G06T 15/10; G06T 17/20;
(Continued)

(56) References Cited

U.S. PATENT DOCUMENTS 9,123,116 B2 9/2015 Debevec et al.
11,823,327 B2 11/2023 Sevastopolskiy et al.
(Continued)

FOREIGN PATENT DOCUMENTS

EP 3 382 645 10/2020
KR 10-1707939 2/2017
(Continued)

OTHER PUBLICATIONS

Nam, Giljoo, et al. "Practical svbrdf acquisition of 3d objects with unstructured flash photography." ACM Transactions on Graphics (TOG) 37.6 (2018): 1-12. (Year: 2018).*
(Continued)

*Primary Examiner* — Daniel F Hajnik
(74) *Attorney, Agent, or Firm* — Nixon & Vanderhye P.C.

(57) ABSTRACT

The disclosure provides a method for generating relightable 3D portrait using a deep neural network and a computing device implementing the method. A possibility of obtaining, in real time and on computing devices having limited processing resources, realistically relighted 3D portraits having quality higher or at least comparable to quality achieved by prior art solutions, but without utilizing complex and costly equipment is provided. A method for rendering a relighted 3D portrait of a person, the method including: receiving an input defining a camera viewpoint
(Continued)

and lighting conditions, rasterizing latent descriptors of a 3D point cloud at different resolutions based on the camera viewpoint to obtain rasterized images, wherein the 3D point cloud is generated based on a sequence of images captured by a camera with a blinking flash while moving the camera at least partly around an upper body, the sequence of images comprising a set of flash images and a set of no-flash images, processing the rasterized images with a deep neural network to predict albedo, normals, environmental shadow maps, and segmentation mask for the received camera viewpoint, and fusing the predicted albedo, normals, environmental shadow maps, and segmentation mask into the relighted 3D portrait based on the lighting conditions.

20 Claims, 5 Drawing Sheets

Related U.S. Application Data continuation of application No. PCT/KR2021/012284, filed on Sep. 9, 2021.

(51) Int. Cl.
  G06N 3/084 (2023.01)
  G06T 7/194 (2017.01)
  G06T 15/04 (2011.01)
  G06T 15/10 (2011.01)
  G06T 17/20 (2006.01)

(52) U.S. Cl.
  CPC ............. *G06T 7/194* (2017.01); *G06T 15/04* (2013.01); *G06T 15/10* (2013.01); *G06T 17/20* (2013.01); *G06T 2207/10016* (2013.01); *G06T 2207/10152* (2013.01); *G06T 2207/20081* (2013.01); *G06T 2207/20084* (2013.01); *G06T 2207/30201* (2013.01); *G06T 2207/30244* (2013.01); *G06T 2215/12* (2013.01)

(58) Field of Classification Search
  CPC ........... G06T 2207/10016; G06T 2207/10152; G06T 2207/20081; G06T 2207/20084; G06T 2207/30201; G06T 2207/30244; G06T 2215/12; G06T 7/11; G06T 7/579; G06T 17/00; G06T 2210/36; G06T 2210/56; G06T 15/506; G06T 15/20; G06F 18/2148; G06N 3/084; G06N 3/045; G06V 10/60; G06V 10/82; G06V 40/161
  See application file for complete search history.

(56) References Cited

U.S. PATENT DOCUMENTS

| | | | |
|---|---|---|---|
| 2013/0286161 A1* | 10/2013 | Lv | G06T 7/55 348/46 |
| 2016/0314619 A1 | 10/2016 | Luo | |
| 2017/0161938 A1 | 6/2017 | Imber et al. | |
| 2018/0365874 A1 | 12/2018 | Hadap | |
| 2019/0035149 A1 | 1/2019 | Chen et al. | |
| 2019/0213778 A1 | 7/2019 | Du et al. | |
| 2020/0201165 A1 | 6/2020 | Lock | |
| 2020/0205723 A1 | 7/2020 | Massey et al. | |
| 2020/0219301 A1 | 7/2020 | Yu | |
| 2020/0258247 A1 | 8/2020 | Lasserre et al. | |

FOREIGN PATENT DOCUMENTS

| | | |
|---|---|---|
| KR | 10-2018-0004635 | 1/2018 |
| KR | 10-2020-0057077 | 5/2020 |
| KR | 10-2020-0104068 | 9/2020 |
| KR | 10-2020-0129657 | 11/2020 |
| RU | 2 721 180 | 5/2020 |
| WO | 2020/037676 | 2/2020 |

OTHER PUBLICATIONS

Ha, Hyunho, et al. "Progressive acquisition of svbrdf and shape in motion." Computer Graphics Forum. vol. 39. No. 6. 2020. First published Aug. 8, 2020. (Year: 2020).*
U.S. Appl. No. 17/457,078, filed Dec. 1, 2021; Sevastopolskiy et al.
Zhou et al., "Deep single-image portrait relighting", In Proceedings of the IEEE International Conference on Computer Vision, 2019, 9 pages.
Zhang et al., "Neural Light Transport for Relighting and View Synthesis", In Proceedings of ACM Transactions on Graphics, Aug. 9, 2020, 16 pages.
Search Report for RU2021104328/28 dated Feb. 19, 2021, 4 pages.
Decision to Grant for RU2021104328/28 dated Sep. 20, 2021, 18 pages, with its English Translation.
International Search Report and Written Opinion dated Dec. 24, 2021 in corresponding International Application No. PCT/KR2021/012284.
Kara-Ali Aliev et al., "Neural point-based graphics", In: Computer Vision, ECCV 2020, 16th European Conference, Aug. 23-28, 2020, Springer International Publishing.
M. Sabbadin et al., "High Dynamic Range Point Clouds for Real-Time Relighting" Pacific Graphics 2019, vol. 38 (2019), No. 7, Nov. 14, 2019, pp. 513-525.
Murmariri, Lukas, et al. A Datasetof Multi-Illumination Images in the Wild. 2019 IEEE/CVF International Conference on Computer Vision (ICCV). IEEE. (Year: 2019).
Yu, Ye, et al. Self-supervised outdoor scene relighting. Computer Vision—ECCV 2020: 16th European Conference, Glasgow, UK, Aug. 23-28, 2020, Proceedings, Part )(XII 16. Springer International Publishing, 2020. (Year: 2020).

* cited by examiner

METHOD FOR RENDERING RELIGHTED 3D PORTRAIT OF PERSON AND COMPUTING DEVICE FOR THE SAME

CROSS-REFERENCE TO RELATED APPLICATIONS

This application is a Continuation of U.S. application Ser. No. 17/457,078, filed Dec. 1, 2021 (U.S. Pat. No. 11,823, 327), which claims priority to International Application No. PCT/KR2021/012284 filed Sep. 9, 2021, which designated the US and claims priority to RU 2020137990 filed Nov. 19, 2020 and RU 2021104328 filed Feb. 19, 2021, the entire contents of which are all hereby incorporated herein by reference in their entireties.

BACKGROUND

Field

The disclosure relates to Artificial Intelligence (AB-based image processing, and for example, to a method for generating relightable 3D portrait using a deep neural network and a computing device implementing the method.

Description of Related Art

The rise of mobile photography comes hand-in-hand with the pervasiveness of two-dimensional displays. As three-dimensional display devices such as VR headsets, AR glasses, 3D monitors are becoming widespread, expanding mobile photography to 3D content acquisition and processing becomes a demanded field of technology development. Most 3D displays project 3D models into either the user surrounding (AR glasses) or the virtual environment (VR headsets, 3D monitors). Thus, to enhance the realism of such models, the models should be made relightable in a realistic way according to their environment (real or synthetic).

Building realistic relightable 3D models is a far less investigated area of research. Prior art solutions either focus on single-view relightable reconstruction (significantly limiting the quality characteristics of the model that can be obtained), or on the acquisition of relightable models using specialized equipment (light stages). Article titled as "*Deep single-image portrait relighting*" by H. Zhou, S. Hadap, K. Sunkavalli, and D. W. Jacobs (In Proceedings of the IEEE International Conference on Computer Vision, 2019) and an article titled as "*Neural Light Transport for Relighting and View Synthesis*" version 1 (v1) by X. Zhang, S. Fanello, Y.-T. Tsai, T. Sun, T. Xue, R. Pandey, S. Orts-Escolano, P. Davidson, C. Rhemann, P. Debevec, J. Barron, R. Ramamoorthi, W. Freeman (In Proceedings of ACM Transactions on Graphics. August 2020) may be considered as related art.

SUMMARY

Embodiments of the disclosure provide methods, computing devices, and systems for obtaining photorealistic 3D models of human heads or upper bodies (which are referred to as 3D human portraits) from videos captured by conventional cameras of currently available handheld devices with limited resources, e.g. from shots by a smartphone camera.

Referring to various embodiments of the disclosure, the system (the term "system" is used herein interchangeably with the terms "method" and "device" to refer to the combination of features and hardware parts) requires only a video of a person captured by a smartphone camera with interleaved flash and no-flash images (frames). Given such a video, the embodiments of the disclosure may prepare a relightable model and render a relighted 3D portrait of the person from an arbitrary viewpoint. Embodiments of the disclosure may thus be advantageously applied to AR, VR, and 3D display devices.

Embodiments of the disclosure may use neural point-based graphics and 3D point clouds as geometric proxies. The photometric information may be coded in the form of latent descriptors of individual points in the clouds. The points and their latent descriptors may be rasterized for novel camera viewpoints (for example, a viewpoint requested by corresponding manipulations of a user in a VR environment), and the rasterizations may be processed by a trained (e.g., learned) system including, for example, a deep neural network trained (learned) to predict per-pixel albedo, normals (normal directions), environmental shadow maps, and segmentation mask, as observed for the novel camera viewpoint, and render 3D portrait of the person based on the predicted information.

During the scene reconstruction process, the model may be fitted to the video images and auxiliary parameters of the scene lighting and the camera flash are estimated along the way. Human face-specific priors may be used to disentangle scene lighting and albedo factors. While the priors are measured in the facial part of the scene, they facilitate disentanglement across the whole 3D portrait. Once reconstructed, the scene (portrait) may be rendered from new viewpoints and with new lighting at interactive speeds.

According to an example embodiment, a method for rendering a relighted 3D portrait of a person is provided, the method including: receiving an input defining a camera viewpoint and lighting conditions, rasterizing latent descriptors of a 3D point cloud at different resolutions based on the camera viewpoint to obtain rasterized images, wherein the 3D point cloud is generated based on a sequence of images captured by a camera with blinking flash while moving the camera at least partly around an upper portion of the person, the sequence of images comprising a set of flash images and a set of no-flash images, processing the rasterized images with a deep neural network to predict albedo, normals, environmental shadow maps, and a segmentation mask for the received camera viewpoint, and fusing the predicted albedo, normals, environmental shadow maps, and segmentation mask into a relighted 3D portrait based on the lighting conditions.

According to an example embodiment, a computing device is provided, the computing device comprising: a processor and a memory storing processor-executable instructions and weights of a deep neural network, latent descriptors, and auxiliary parameters obtained during a training stage, wherein upon execution of the processor-executable instructions by the processor the processor causes the computing device to carry out a method for rendering a relighted 3D portrait of a person according to the above example method or any further implementation of the above example method.

Example advantages of various example embodiments of the disclosure may include, for example, and without limitation: (1) a neural rendering model that supports relighting and is based on 3D point cloud geometry; and (2) an albedo-lighting disentangling approach utilizing face priors. By combining these, is the disclosed a system is capable of generating realistically relighted 3D portrait of a person based simply on a sequence of images captured by conventional camera, which supports real-time rendering. Thus, embodiments of the disclosure obtain, in real time and on computing devices having limited processing resources, realistically relighted 3D portraits having quality higher or at least comparable to quality achieved by prior solutions, without utilizing complex and costly image acquisition equipment (such as, e.g., light stages). Therefore, a computing device (e.g. smartphone, a tablet, or VR/AR/3D display device/glasses, or a remote server) with the functionality of the claimed system ensures significantly better user experience and improves adoption of VR and AR technologies.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
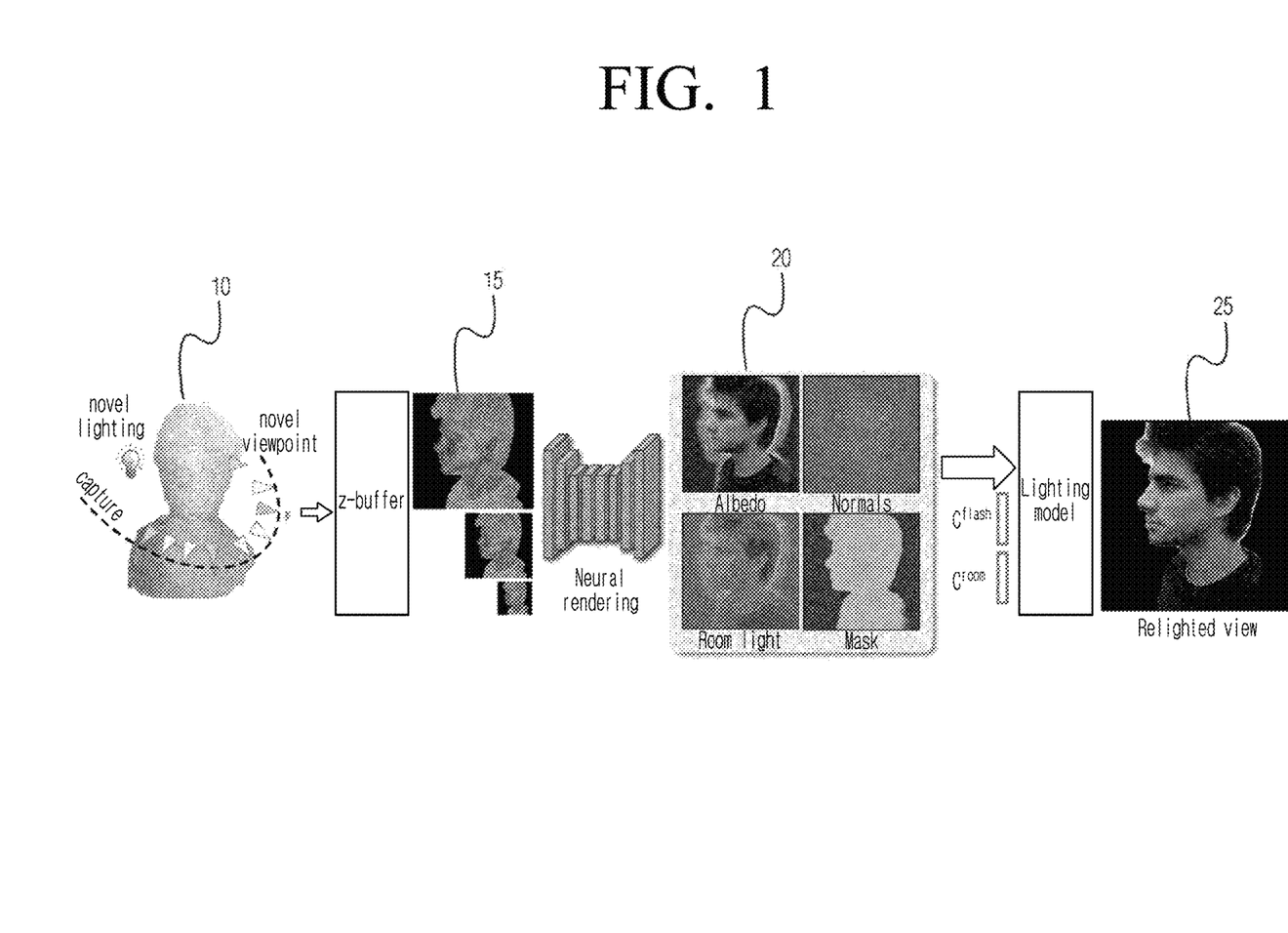
FIG. 1 is a diagram illustrating an example of an overall processing pipeline according to various embodiments.

FIG. 1 is a diagram illustrating an example of an overall processing pipeline according to various embodiments. The illustrated processing pipeline may be implemented fully or partly on currently available computing devices such as, for example, and without limitation, a smartphone, a tablet, VR (Virtual Reality) display device, AR (Augmented Reality) display device, 3D display device, etc. VR, AR, and 3D display devices may, for example, be in the form of smart glasses. When implemented partly, the computationally demanding operations (e.g., operations of training stage) may be performed in the cloud, for example by a server.

For generating a relighted 3D portrait of a person the disclosed system may utilize a sequence of images featuring a person. Such sequence of images may be captured by conventional cameras of currently available handheld devices (e.g. by a smartphone camera). The sequence of images may be provided to the pipeline from user gallery (when access to the gallery is permitted by the user) or downloaded from a web-resource. However, it will be understood that the source of the sequence of images is not limited.

The sequence of images may be captured by a camera with blinking flash while moving the camera at least partly around the person (e.g., partly around an upper body of the person). Thus, the sequence of images comprises a set of flash images and a set of no-flash images. These features facilitate albedo-lighting disentanglement for subsequent lighting modifications including the cases of complete relighting of 3D portrait or partial relighting of 3D portrait according a novel camera viewpoint. Relighting may be performed to completely new lighting conditions, e.g., lighting conditions replacing lighting that took place when capturing the sequence of images with new arbitrary lighting conditions. Relighting may be performed to relight certain parts of 3D portrait by correctly extrapolating lighting that took place when capturing the sequence of images to said parts of 3D portrait.

The sequence of images may be captured with blinking flash using standard functionality of a camera of the computing device or using any available software or an application (e.g. Open Camera app) suitable for image acquisition with blinking flash. The dotted curved line in FIG. 1 illustrates and example trajectory of the camera sweep around, for example, the upper body of a person. The upper body may include, but is not limited to, head, shoulders, arms, and chest of the person. As a non-limiting example, capturing may be made with controlled white balance, 30 FPS, $1/200$ s shutter speed and ISO of approximately 200 (to be selected for each sequence according to the lighting conditions). During each recording, the camera flash is blinking, for example, once per second, each time turning on for, for example, 0.1 s. Camera blinking may be regular or irregular. The captured sequence of images preferably cover the entire upper body of a person, for whom the relighted 3D portrait is generated. Each person is photographed for, for example, 15-25 seconds. Particular values are given in this paragraph only as examples and not limitations. Specific values can be selected from the appropriate ranges, for example +/−10-50% from the given particular values.

The person should stand substantially still during the capturing process. For example, it is assumed that the user's head is directed forward and remains substantially motionless throughout the camera sweep during the capturing process. The camera sweep may be performed, for example, by a person herself/himself as a selfie or by a third person. The camera sweep may cover 180° or less around the person, for example from the left side of the upper body through the face side of the upper body to the right side of the upper body or in the opposite direction, but the disclosure is not limited thereto.

A 3D point cloud 10 may be generated based on the sequence of captured images. The 3D point cloud 10 may be generated using, for example, and without limitation, a Structure-from-Motion (SfM) technique or any other known techniques allowing to reconstruct 3D structure of a scene or object based on the sequence of 2D images of that scene or object. Each point in the 3D point cloud 10 may be augmented with latent descriptor, for example, a multi-dimensional latent vector characterizing properties of the point. Latent descriptors may be sampled from a predefined probability distribution, e.g. from a unit elementwise Gaussian, and may later be fitted at the training stage. Each latent descriptor may serve as a memory vector for the deep neural network (also referred to as the rendering network and described in greater detail below) and may be used by the network to infer geometric and photometric properties of each point. The 3D point cloud is generated and camera viewpoints are estimated based on the set of flash images or the set of no-flash images.

Latent descriptors of the generated 3D point cloud may be rasterized at different resolutions according to a requested new camera viewpoint to obtain rasterized images 15. The rasterization may be made using, for example, and without limitation, a Z-buffering technique or any other known techniques allowing to represent images of objects located in 3D space from a particular camera viewpoint. Different resolutions for the rasterization may include, for example, and without limitation, 512×512, 256×256, 128×128, 64×64, 32×32, or the like (during the training stage). During inference, original resolution, e.g. as specified by a user for the new camera viewpoint, may be estimated and a pyramid of rasterizations having gradually decreasing resolutions (for example, 1920×1080, 860×540, 430×270, 215×145, 107×72) may be made. Feeding a rasterization pyramid with different resolutions (from high to low) to the neural network allows the neural network to take into account both the details of the images (from higher resolution rasterization) and the proximity of points to the camera (from lower resolution rasterizations that do not contain "show-throughs" between the projected points of the 3D point cloud surface closest to the camera and points of the far surface of said cloud).

The camera viewpoint may be specified in an input directly, for example, and without limitation, in the form of particular coordinates in AR/VR environment, camera direction, focal length and other camera intrinsic parameters, or indirectly, for example, and without limitation, a touch input to a corresponding viewpoint in AR/VR environment, an input corresponding to a viewpoint based on a position and an orientation of a computing device (e.g. a smartphone, AR/VR smart glasses) used for manipulating in AR/VR environment or for displaying certain information therein.

Neural rendering may be performed. Neural rendering may be performed by processing the rasterized images 15 with, for example, a deep neural network trained to predict albedo, normals, environmental shadow maps, and segmentation mask for the received camera viewpoint. The architecture of the deep neural network may correspond, for example, to the U-Net structure with gated convolutions. The training stage of the disclosed system and the architecture of used deep neural network are described in greater detail below with reference to FIG. 4. Predicted albedo, normals, environmental shadow maps, and segmentation mask are collectively indicated in FIG. 1 with the numeral 20. Predicted albedo describes the spatially varying reflectance properties (albedo ρ(x)) of the head surface (skin, hair, or other parts). Predicted normals contain normal vectors n(x) of points at the head surface in the world space. Predicted environmental shadow maps are represented by one-channel group that uses the sigmoid non-linearity and corresponds to the grayscale shadowing $\mathcal{S} \in \mathbb{R}^{H \times W}$ caused by the variations in the room lighting and consequently occurring occlusions. Finally, the predicted segmentation mask is represented by one-channel group that also uses the sigmoid non-linearity and defines the segmentation mask $M \in \mathbb{R}^{H \times W}$ with each pixel containing the predicted probability of the pixel belonging to the head and not the background.

The predicted albedo, normals, environmental shadow maps, and segmentation mask are fused into the relighted 3D portrait 25 according to lighting conditions. Since the originally captured sequence of images comprises the set of no-flash images conveying lighting conditions with which the sequence of images has been captured, the fused 3D portrait may be relighted by completely replacing lighting conditions with which the sequence of images has been captured with new lighting conditions in which the user is interested.

Lighting types may include, but are not limited to, ambient lighting, directional lighting, and spherical harmonics lighting, or the like. Input of lighting conditions may be received in any suitable way. Lighting-related auxiliary parameters may also include, but not limited to, room lighting color temperature $C^{room}$, and flashlight color temperature $C^{flash}$, etc. $C^{room}$ may refer to a color temperature of the shadows in scene lighting (also referred to as room), $C^{flash}$ may refer to an intensity and color temperature of the flash. Both $C^{room}$ and $C^{flash}$ may be represented by vectors of, e.g. 3 numbers common to the entire scene. They are trained (configured) along with the entire system. These parameters will be described in greater detail below. The type of novel lighting required for the user refers to the expression by which the relighted 3D portrait is generated from the predicted per-pixel albedo, normals, environmental shadow maps, segmentation mask, the lighting-related auxiliary parameters and the parameters of novel lighting conditions. This expression is illustrated in FIG. 1 and will be described in greater detail below.

Figure 2:
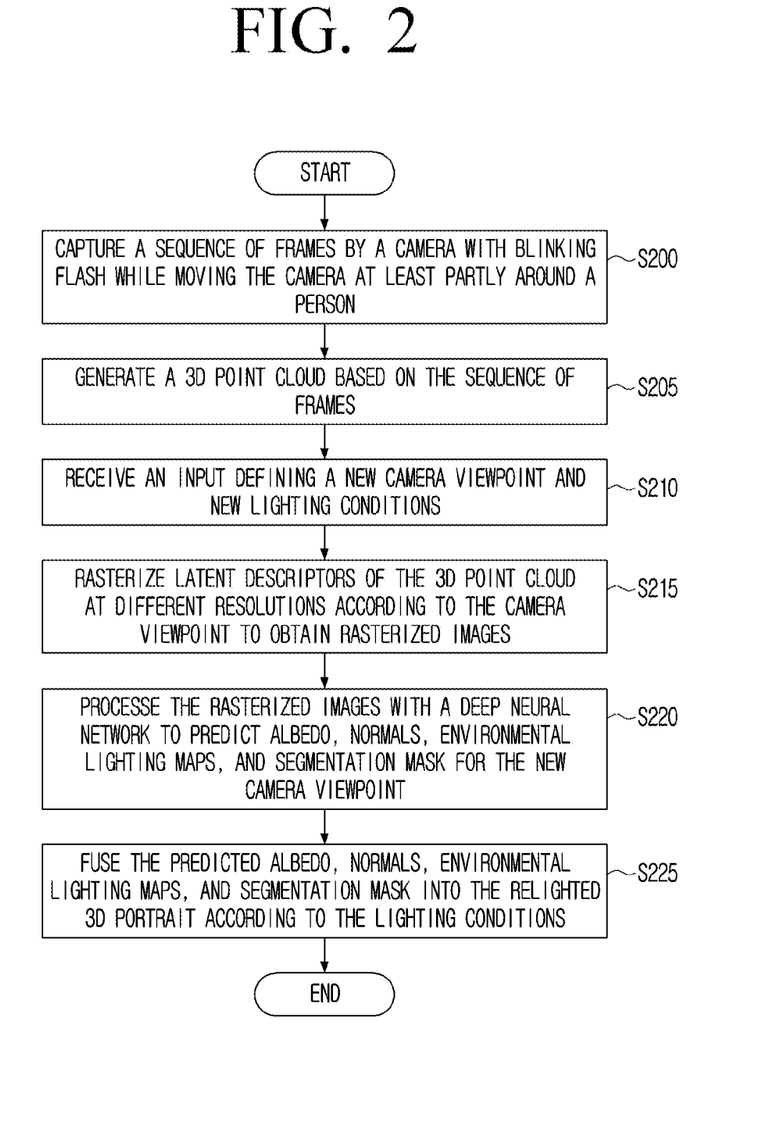
FIG. 2 is a flowchart illustrating an example method for rendering a relighted 3D portrait of a person according to various embodiments.

FIG. 2 is a flowchart illustrating an example method for rendering a relighted 3D portrait of a person according to various embodiments. A sequence of images featuring an upper body of the person is captured at S200 by a camera with blinking flash. During the capturing (e.g. photographing or video capturing) the camera may be moved by the person or a third person at least partly around the upper body of the person. The resulting sequence of images comprises a set of flash images and a set of no-flash images.

A 3D point cloud is generated at S205 based on the captured sequence of images. The 3D point cloud may be generated using, for example, Structure-from-Motion (SfM) technique or any other known techniques allowing to reconstruct 3D structure of a scene or object based on the sequence of 2D images of that scene or object. During the training stage that will be described in greater detail below, the method may include augmenting each point in the 3D point cloud 10 with latent descriptor being a multi-dimensional latent vector characterizing properties of the point.

One or more inputs defining a camera viewpoint and/or lighting conditions are received at S210. Latent descriptors of the 3D point cloud, which are previously obtained during the training stage, are rasterized at S215 at different resolutions according to the camera viewpoint to obtain rasterized images. Neural rendering is performed by processing at S220 the rasterized images with a deep neural network to predict albedo, normals, environmental shadow maps, and segmentation mask for the received (e.g., new) camera viewpoint. Before the inference stage the deep neural network is trained as will be discussed in greater detail below with reference to FIG. 4. The relighted 3D portrait is rendered by fusing at S225 the predicted albedo, normals, environmental shadow maps, and segmentation mask into the relighted 3D portrait according to the received lighting conditions.

Figure 3:
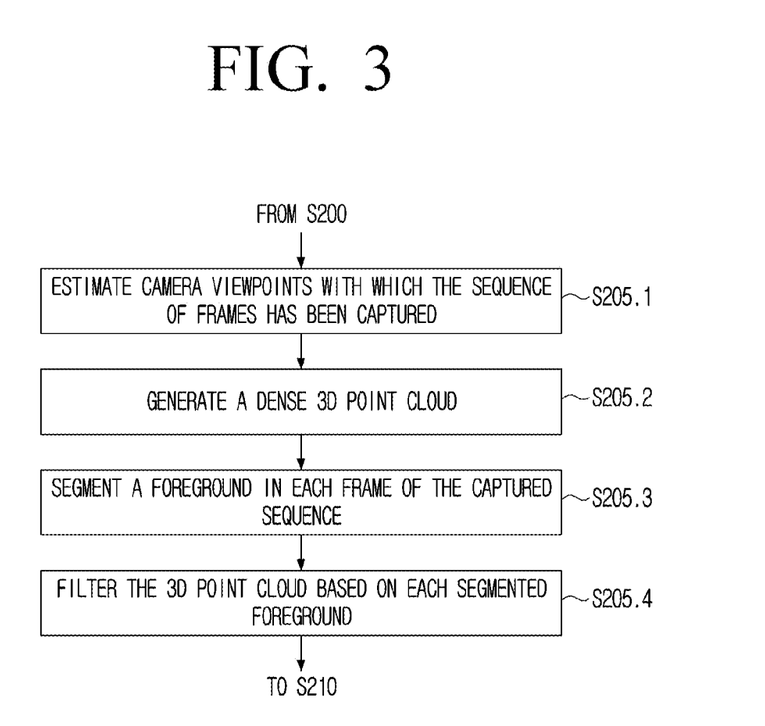
FIG. 3 is a flowchart illustrating example details of generating a 3D point cloud based on the sequence of images according to various embodiments.

FIG. 3 is a flowchart illustrating example details of operation S205 of generating the 3D point cloud based on the sequence of images according to various embodiments. Generating the 3D point cloud at S205 may further include estimating S205.1 camera viewpoints with which the sequence of images is captured. The camera viewpoints estimated at step S205.1 may be used for generating the 3D point cloud as well as for training the deep neural network, latent descriptors for the 3D point cloud, and auxiliary parameters during the training stage. The camera viewpoint and the lighting conditions received at S210 (e.g., new or arbitrary camera viewpoint and lighting conditions requested by a user) via the input differ from camera viewpoints estimated at S205.1 and lighting conditions with which the sequence of images is captured (e.g., current camera viewpoints and lighting conditions during capturing). Estimating camera viewpoints at S205.1 may be performed using for example, SfM. Points of the originally generated 3D point cloud at least partly corresponding to an upper body of the person.

Generating S205 the 3D point cloud may further include actually generating a dense 3D point cloud at S205.2, processing each image of the sequence by segmenting at S205.3 a foreground and filtering at S205.4 the 3D point cloud based on the segmented foreground by a segmentation neural network to obtain the filtered 3D point cloud. 3D point cloud 10 generated as the result of processing at S205.3 and S205.4 may only include points of the upper body of the person (e.g., points related to background may be excluded). The segmentation neural network may, for example, include a deep neural network that receives an image and produces a per-pixel segmentation mask with real values between 0 and 1. For a given threshold scalar value between 0 and 1, all values in the mask below the threshold are considered background, and the rest are considered foreground (the object). Such a network can be e.g. trained using a large collection of images and corresponding masks with a loss function that penalizes for divergence of predicted mask from ground truth mask. The segmented foreground may be estimated for each image of the captured video, and for each of the images and corresponding camera viewpoints, a 3D frustum may be constructed by casting rays from the camera through pixels that belong to the segmented foreground. Points of 3D point cloud that do not belong to the intersection of the frustums are filtered out, and thus, the filtered 3D point cloud is constructed.

Such segmenting and filtering can improve the quality characteristics of the generated 3D portrait by improving the accuracy of albedo, normals, environmental shadow maps, and segmentation mask predictions 20 performed by the deep neural network.

Figure 4:
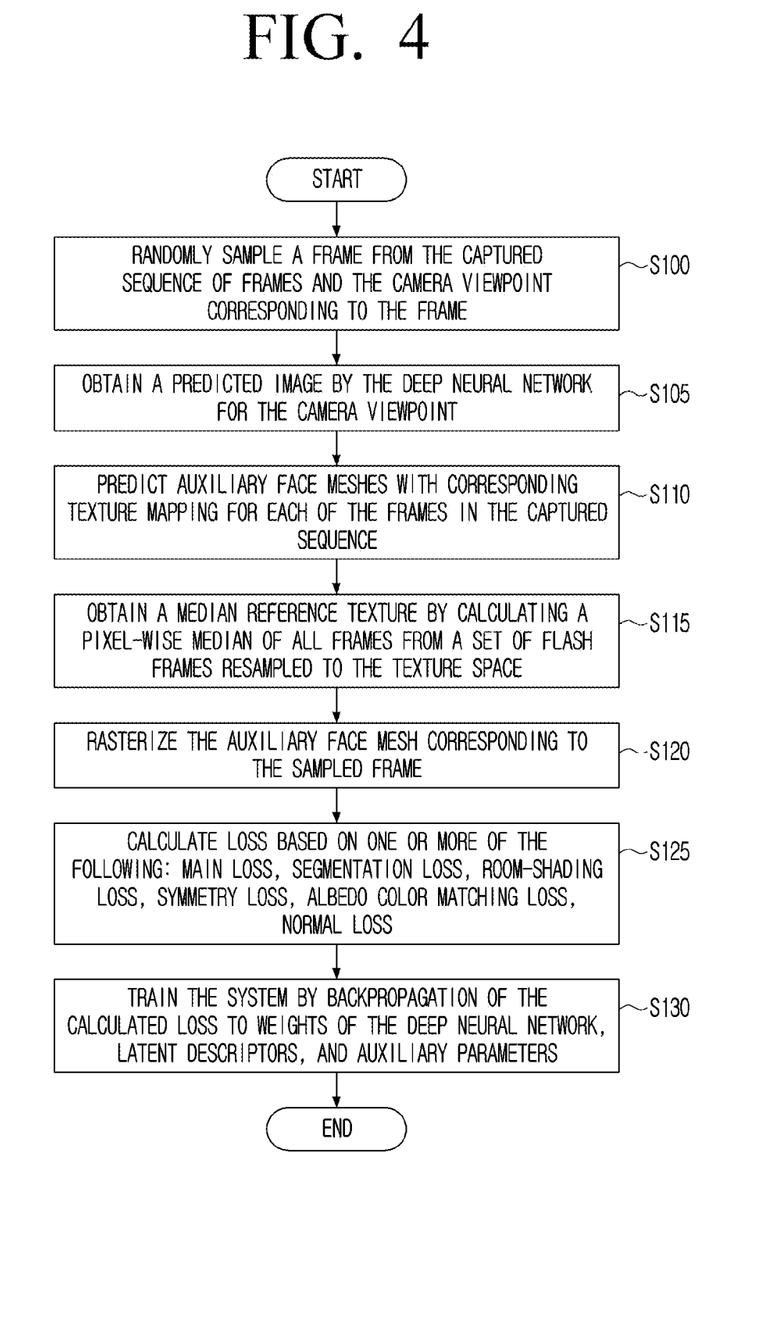
FIG. 4 is a flowchart illustrating an example of the training stage of the system according various embodiments.

FIG. 4 is a flowchart illustrating an example of the training stage of the system according to various embodiments. Training may be performed on the same computing device 50 (see FIG. 5), on which the relighted 3D portrait is rendered or outside the device, for example on a server (not shown). If the training is performed on the server, the sequence of images captured at S200 and all the other information used herein as the training information may be transmitted to the server. The server may perform the training as well as any training data conditioning operations as disclosed herein and transmit the trained deep neural network, latent descriptors of the 3D point cloud, and auxiliary parameters back to the computing device for use at inference stage. For this, the computing device may include a communication unit (e.g., including communication circuitry). Training may be performed iteratively, a single iteration is illustrated in FIG. 4. Before the start of training weights and other parameters of the deep neural network, values of latent descriptors, values of auxiliary parameters may be initialized randomly. Auxiliary parameters may include, for example, and without limitation, one or more of room lighting color temperature, flashlight color temperature, and albedo half-texture.

An image and a camera viewpoint corresponding to the image are randomly sampled at S100 from the captured sequence of images. A predicted image (e.g., predicted albedo, normals, environmental shadow maps, and segmentation mask) for the camera viewpoint is obtained at S105 by the deep neural network. Auxiliary face meshes with corresponding texture mapping are predicted at S110 by a 3D face mesh reconstruction network for each of the images (or frames) in the captured sequence, including the image randomly sampled at S100. The corresponding texture mapping may include a specification of two-dimensional coordinates in the fixed, predefined texture space for every vertex of the mesh. 3D face mesh reconstruction network may include a deep neural network that predicts a triangular mesh of the face found on an input image that is aligned with the face on the input image. Such a network can be trained via various supervised, self-supervised, or unsupervised approaches. Non-limiting examples include PRNet model and 3DDFA_v2 model.

A median reference texture is obtained at S115 by calculating a pixel-wise median of all images from the set of flash images resampled to the texture space by the bilinear interpolation. Texture space may, for example, be a rectangle on a 2D plane, where each point has fixed semantics related to the facial region (e.g. a point (0.3, 0.3) might always correspond to the left eye, and point (0.5, 0.5) might always correspond to the tip of the nose). The more precise is the prediction of the auxiliary face mesh with texture mapping, the closer the predicted two-dimensional coordinates of each mesh vertex are to their corresponding semantics in the texture space. The auxiliary face meshes predicted at S110 are rasterized at S120 using color-coding vertices of the face mesh with their geometric normals and Z-buffering. Color-coding vertices with their geometric normals is a process of assigning R, G, B color channels for each point to X, Y, Z coordinates of a normal vector in that point, respectively. Then, the assigned RGB colors are rasterized via Z-buffering.

Loss is calculated at S125 based, for example, and without limitation, on a combination of one or more of the following losses: main loss, segmentation loss, room shading loss, symmetry loss, albedo color matching loss, normal loss. The main loss may be calculated as a mismatch between the predicted image (from S105) and the sampled image (from S100) by a combination of non-perceptual and perceptual loss functions. The segmentation loss may be calculated as a mismatch between the predicted segmentation mask and the segmented foreground. Room shading loss may be calculated as a penalty for the sharpness of the predicted environmental shadow maps, wherein the penalty increases as the sharpness increases. The symmetry loss may be calculated as a mismatch between the mirrored albedo half-texture and the predicted albedo (from S105) resampled in the texture space by the bilinear interpolation.

The albedo color matching loss may be calculated as a mismatch between the median reference texture (from S115) and the predicted albedo (from S105) resampled in the texture space by the bilinear interpolation. The normal loss may be calculated as a mismatch between the predicted normals (from S105) and rasterized images (from S120) of the auxiliary face mesh corresponding to the sampled image. Once the loss is calculated at S125, the loss is backpropagated at S130 to weights of the deep neural network, latent descriptors, and auxiliary parameters. In other words, weights of the deep neural network, latent descriptors, and auxiliary parameters are updated based on the loss calculated at S125. A next iteration may be performed starting again from S100. The deep neural network is trained for a fixed (predetermined) number of iterations (80,000 iterations in the non-limiting example).

For a given point x in a space which belongs to the surface of a volumetric object, the level of radiance of the light emitted at the location x in direction $\omega_o$ is commonly described by the rendering equation:

$$L_o(x, \omega_o) = \int_S f_r(x, \omega_i, \omega_o) L_i(x, \omega_i) v(x, \omega_i) \cdot (-\omega_i, n(x)) d\omega_i, \quad (1)$$

where $L_i(x,\omega_i)$ defines the incoming radiance to x in direction $\omega_i$, $S$ stands for the upper hemisphere with respect to the surface tangent plane at x with the unit normal n(x). Also, $f_r(x,\omega_i,\omega_o)$ is a ratio of scattered light intensity in the direction $\omega_o$ and the incoming at direction $\omega_i$, which is usually referred to as the bidirectional reflectance distribution function (BRDF). Furthermore, $v(x,\omega_i)$ is a visibility term (equals to 1 if a point x is reachable by the light from direction $\omega_i$, or 0 if there is an occlusion in that direction), and $L_o(x,\omega_o)$ defines the total radiance coining from x in direction $\omega_0$. In terms of this model, BRDF is a material property that describes its spatially-varying light scattering properties. Since captured are images that are RGB images, values, $L_o(x,\omega_o)$, $L_i(x,\omega_i)$, $f_r(x,\omega_i,\omega_o)$ are all in $\mathbb{R}^3$, with each component (channel) calculated independently.

According to an example embodiment, the person (the subject) is captured using a set of images taken with an environment lighting, and another set images in the same environment additionally lighted by a camera flash. As described above blinking flash may be used. To model these two sets of images, the incoming radiance may be decomposed with visibility into two terms:

$$L_i(x,\omega_i)v(x,\omega_i) = L_i^{room}(x,\omega_i)v^{room}(x,\omega_i) + F \cdot L_i^{flash}(x,\omega_i)v^{flash}(x,\omega_i). \quad (2)$$

where $L_i^{room}(x,\omega_i)$ stands for the environmental (room) light, $L_i^{flash}(x,\omega_i)$ stands for the flash light, and F indicated if the photo is taken with the flash turned on (F=1) or turned off (F=0). Here, $v^{room}$ and $v^{flash}$ model the light occlusion for environmental and the flash lighting respectively.

It is further assumed that the BRDF is Lambertian (e.g., constant at each point) $f_r(x,\omega_i,\omega_o)=p(x)$ (with the normalizing constant omitted), corresponds to a diffuse surface, and p(x) stands for the surface albedo at x. It is noted that with the neural rendering, the system can model some amount of non-Lambertian effects since the albedo in the model can be effectively made view-dependent. Applying the modifications to (1) to get the following:

$$L_o(x, \omega_o) = \rho(x) \int_S L_i^{room}(x, \omega_i) v^{room}(x, \omega_i) \cdot (-\omega_i, n(x)) d\omega_i + \quad (3)$$

$$F \cdot \rho(x) \int_S L_i^{flash}(x, \omega_i) v^{flash}(x, \omega_i) \cdot (-\omega_i, n(x)) d\omega_i.$$

Suppose now that the integral in the first part is equal to $\bar{s}(x) \in \mathbb{R}^3$ and defines the shadowing caused both by the room lamps and occlusions (e.g. a nose casting shadow on a cheek, in case of a human head). The shadowing may be modelled as a product of color temperature and grayscale shadowing $\bar{s}(x) = C^{room} \cdot s(x)$, $C_{room} \in \mathbb{R}^3$, $s(x) \in \mathbb{R}$. As for the second (flash) part, the incoming light radiance is modeled explicitly as $$L_i^{flash}(x, \omega_i) = \frac{C^{flash}}{d(x)^2},$$

where d(x) is the distance from the flash to x, and $C_{flash} \in \mathbb{R}^3$ is a constant vector proportional to the color temperature and intensity of the flash. It is assumed that the flash is far enough, and hence, $d(x) \approx d$, with d being the distance from the camera to its closest point in the 3D point cloud, and the light rays from the flash are approximately parallel. Since on a smartphone, flashlight and the camera lens are usually co-located at close proximity (at $\omega_o$), it is assumed that $v^{flash}(x,\omega_i)=1$ for all x observed in a flash image (flashlighted image). Based on that the transformation of (3) into (4) may be performed:

$$L_o(x, \omega_o) = \rho(x) C^{room} s(x) + F \cdot \rho(x) \frac{C^{flash}}{d^2} (n(x), -\omega_o) \quad (4)$$

Note that in (4), the decomposition of the light intensity $L_o(x,\omega_o)$ into separate components is ambiguous, as is common to most lighting-albedo estimation problems. In particular, there is an inverse proportional relationship between p(x) and both $C^{room}$ and $C^{flash}$. This ambiguity is resolved in the disclosure using appropriate priors as described in details below in the «Model fitting» section.

After describing the lighting model, geometric modeling is described. It is assumed that $\mathcal{I} = \{I_1, \ldots, I_P\}$, $I_k \in \mathbb{R}^{H \times W \times 2}$, is a sequence of images of an upper body of a person, all taken by a smartphone camera in the same environment and featuring the upper body, including a head of the person, from various angles. A set of flash images is $\mathcal{I} = \{I_{s_1}, \ldots, I_{s_M}\}$, e.g., this set comprises photos featuring the upper body of the person additionally illuminated with a camera flash. Structure-from-Motion (SfM) techniques may be used to estimate (reconstruct) camera viewpoints $C_1, \ldots, C_P$ of each image: $C_k=(K_k, [R_k, t_k])$. Then, a 3D point cloud $P=\{p_1, \ldots, p_N\}$, $p_i=\{x_i, y_i, z_i\}$ from all images is estimated (reconstructed) similarly. Any known method or software including SfM may be employed for 3D point cloud estimation.

Since the person is modeled without background, a foreground is segmented at S205.3 and the 3D point cloud is filtered at S205.4 based on the segmented foreground by a segmentation neural network to obtain the filtered 3D point cloud. As the example, and not the limitation. $U^2$-Net segmentation network designed for a salient object segmentation task may be used as the segmentation neural network. The pretrained $U^2$-Net model may be additionally fine-tuned with warm-up training schedule on, for example, the Supervisely human segmentation dataset to make it more suitable for present task. After that, images $\mathcal{I}$ are passed through the fine-tuned segmentation neural network and the sequence of initial 'soft' masks $\mathcal{M}^0 = \{M_1^0, \ldots, M_P^0\}$, $M_k^0 \in \mathbb{R}^{H \times W \times 1}$ is obtained. M-view consistency of the silhouettes may be achieved via visual hull estimation using the 3D point cloud as a geometric proxy, and using the weights of the segmentation neural network as a parameterization. This is performed by fine-tuning the weights of the segmentation neural network to minimize and/or reduce the inconsistency of segmentations across the views, which results in obtaining the refined masks $\mathcal{M} = \{M_1, \ldots, M_P\}$.

Neural rendering is based on a deep neural network predicting albedo, normals, and environmental shadow maps from the 3D point cloud rasterized onto each camera view. Each point in the 3D point cloud is augmented with latent (neural) descriptor, e.g., a multi-dimensional latent vector characterizing point properties:

$\mathcal{D} = \{d_1, \ldots, d_N\}$, $d_k \in \mathbb{R}^L$ (L may be equal to 8, but without the limitation).

The neural rendering stage then starts with the rasterization of the latent descriptors onto the canvas associated with the camera $C_k$. This may be performed as follows: the raw image (rasterized image) $S[0]=S[0](\mathcal{P}, \mathcal{D}, C_k) \in \mathbb{R}^{H \times W \times L}$ is formed by Z-Buffering the 3D point cloud (for each pixel, finding the closest point to the camera which projects to this pixel). The latent descriptor of each of the closest points is assigned to the respective pixel. In case there are no point which project to some pixel, a null descriptor is assigned to that pixel instead. Similarly, a set of auxiliary raw images $S[1], \ldots, S[T]$ of spatial sizes $$\frac{H}{2^1} \times \frac{W}{2^1}$$

is constructed and the rasterization of latent descriptors is performed onto these images by the same algorithm. A pyramid of the raw images is introduced to cover the 3D point cloud at several scales (resolutions). The highest resolution raw image $S[0]$ features the richest spatial detail, while the lower resolution ones feature less surface bleeding.

The set of raw images $S[0], \ldots, S[T]$ is processed the deep neural network $f_\phi(S[0] \ldots, S[T])$ closely following the U-Net structure with gated convolutions. Each of the raw images may be passed as an input (or concatenated) to the first layer of the network encoder of the respective resolution. The output of the deep neural network is the set of dense maps. These maps may contain output RGB values.

The overall processing pipeline according to various embodiments is outlined in FIG. 1. The last layer of the deep neural network may output an eight-channel tensor with several groups:

- The first group contains three channels and uses sigmoid non-linearity. These channels contain the albedo values $A \in \mathbb{R}^{H \times W \times 3}$. Each pixel of A describes the spatially varying reflectance properties (albedo $\rho(x)$) of the head surface (skin, hair, or other parts).
- The second group also has three channels, and uses groupwise $L_2$ normalization in the end. This group contains the rasterized normals $N \in \mathbb{R}^{H \times W \times 3}$, with each pixel containing a normal vector $n(x)$ of the point at the head surface in the world space.
- One-channel group that uses the sigmoid non-linearity, corresponds to the grayscale shadowing $S \in \mathbb{R}^{H \times W}$, caused by the variations in the room lighting and consequently occurring occlusions.
- The last one-channel group that also uses the sigmoid non-linearity, defines the segmentation mask $M \in \mathbb{R}^{H \times W}$, with each pixel containing the predicted probability of the pixel belonging to the head and not the background.

Given the output of the deep neural network, the final rendered image (e.g., the relighted 3D portrait) is defined by fusing the albedo, normals, and environmental shadow maps, and segmentation mask as prescribed by the lighting model (4) (e.g., according to the lighting conditions):

$$\mathcal{I} = A \cdot C^{room} \cdot S + F \cdot A \frac{C^{flash}}{d^2}(N, -\omega_o), \quad (5)$$

where the scalar product $(N, -\omega_o)$ is applied to each pixel. The color temperature vectors $C^{room}$ and $C^{flash}$ both in $\mathbb{R}^3$ are considered part of the model and are shared between all pixels. These vectors may be estimated from training data as discussed below. At the inference time, feature maps A and N, as well as $C^{room}$, $C^{flash}$ parameters, can be used to render the person upper body under a different modified lighting, such as directional lighting ($\mathcal{I}' = A \cdot \lfloor (N, -\omega) \rfloor$) or other models such as spherical harmonics (SH). In the latter case, the albedo A is multiplied by a non-linear function of the pixel normals N that incorporates the SH coefficients. When a 360° panorama of a new environment is available, one can obtain the values of the SH coefficients (up to the predefined order) by the panorama integration. It is known that choosing the order of 3 or higher, which results in at least 9 coefficients per color channel, can often yield the expressive lighting effects. In case of the third order SH, the relighted image may be defined as a quadratic form:

$$\mathcal{I}'[i,j] = A[i,j] \cdot [N[i,j]1]^T \cdot M(SH_{coef}) \cdot [N[i,j]1], \quad (6)$$

where the 4×4 matrix $M(SH_{coef})$ linearly depends on the 27 SH coefficients $SH_{Coef}$.

The model contains a large number of parameters that are fitted to the data. During fitting, the obtained images $\mathcal{I}$ (5) are compared with the ground truth images $\mathcal{I}^{gt}$ by a loss constructed as a combination from one or more components that are described below.

The main loss equals to the evaluated mismatch between the predicted image $\mathcal{I}$ and the around truth image $\mathcal{I}^{gt}$:

$$L_{final}(\phi, \mathcal{D}, C^{room}, C^{flash}) = \Delta(\mathcal{I}(\phi, \mathcal{D}, C^{room}, C^{flash}), \mathcal{I}^{gt}), \quad (7)$$

where the mismatch function $\Delta$ is employed to compare pair of images:

$$\Delta(I_1, I_2) = VGG(I_1, I_2) + \beta \cdot L_1(pool_K(I_1), pool_K(I_2)) \quad (8)$$

Here, $VGG(\cdot, \cdot)$ is a perceptual mismatch based on the layers of VGG-16 network, $L_1(\cdot, \cdot)$ refers to the mean absolute deviation, $pool_K(I)$ is the average pooling of an image I with K×K kernel (K may be equal to 4, but without the limitation) and $\beta$ is a balancing coefficient introduced to equalize the range of values of two terms (as the example, $\beta$ may be equal to 2500). While VCG encourages matching of high-frequency details, $L_1$ rewards matching colors. Since naive optimization of $L_1$ can lead to blurring and loss of details, the $L_1$-term may be evaluated over the downsampled images.

Since it is required from the proposed method to segment the rendered head from an arbitrary viewpoint, the segmentation loss constraining the predicted mask M may be introduced:

$$L_{mask}(\phi, \mathcal{D}) = -\log \text{Dice}(M(\phi, \mathcal{D}), M_i), \quad (9)$$

where the Dice function is a common choice of the mismatch for segmentation (evaluated as the pixel-wise F1 score). Effectively, with this loss, the deep neural network trains to extrapolate the pre-calculated masks $\mathcal{M}$ to new viewpoints.

For no-flash images, the rendered image is equal to $\mathcal{I} = A \cdot C^{room} \cdot S$ according to (5). In practice, this creates a certain ambiguity between the learned maps A and S. Since A participates in both terms of (5), the high-frequency component of the renderings tends to be saved in S by default. The following room shading loss implicitly requires A to be fine-grained instead:

$$L_{TV}(\phi, \mathcal{D}) = TV(S(\phi, \mathcal{D})) \quad (10)$$

where TV is a Total Variation loss based on L1.

To further regularize the training process, the particular property of the scenes, namely the presence of the face regions, may be used. For that, for each training image, face alignment is performed using a pretrained 3D face mesh reconstruction network. Known PRNet system, but without the limitation, may be used as the 3D face mesh reconstruction network. Given an arbitrary image I containing a face, the 3D face mesh reconstruction network may estimate a face alignment map, e.g., a tensor Posmap of size 256×256 (the particular size is indicated as the example, and not the limitation) that maps the UV coordinates (in a predefined, fixed texture space associated with the human face) to the screen-space coordinates of the image I.

Let $Posmap_1, \ldots, Posmap_P$ define the position maps calculated for each image in the training sequence. The bilinear sampling (backward warping) of an image I onto Posmap is denoted by the operation I⊙Posmap, which results into mapping the visible part of I into the UV texture space. The mapping thus constructs a colored (partial) face texture.

The gathered face geometry data are employed in two ways. First, throughout the fitting an albedo half-texture $\mathcal{T}_A$ of size 256×128 (for the left or right part of the albedo) is estimated. The particular size (256×128) is given as the example, and not the limitation. The albedo, half-texture $\mathcal{T}_A$ is initialized by taking a pixel-wise median of projected textures for all flash images $T_F=\text{median}(I_{s_1}\odot Posmap_{s_1}, \ldots, I_{s_M}\odot Posmap_{s_M})$ and averaging left and flipped right halves or right and flipped left halves. The symmetry loss is a facial prior that encourages the symmetry of albedo by comparing it with the learned albedo texture:

$$L_{symm}(\phi,\mathcal{D},\mathcal{T}_A)=\Delta(A(\phi,\mathcal{D})\odot Posmap_i,[\mathcal{T}_A,\text{flip}(\mathcal{T}_A)]) \quad (11)$$

(the mismatch function is evaluated only where $A(\phi,\mathcal{D})\odot Posmap_i$ is defined).

$[\mathcal{T}_A, \text{flip}(\mathcal{T}_A)]$ denotes the concatenated texture and its horizontally flipped version. This loss both makes albedo more symmetric and matches albedo texture $\mathcal{T}_A$ colors with the ones of the learned albedo. The balance between these two factors is controlled by the learning rate for $\mathcal{T}_A$. In the disclosure, the symmetry loss helps resolving the decomposition of an image into albedo and shadows, as the opposite points of the face (e.g. left and right cheeks) can have similar albedo, while casted shadows are most often non-symmetric.

To select the gamma for albedo, the albedo color matching loss may be introduced $L_{cm}(\phi,\mathcal{D})=L_1(A(\phi,\mathcal{D})\odot Posmap_i,\mathcal{T}_F)$ (also calculated only for valid texture elements of $A(\phi,\mathcal{D})\odot Posmap_i$).

Another type of data which can be inferred from the 3D face mesh reconstruction network (e.g. PRNet) outputs is the normals for the face part. Each face alignment map, along with the estimated depth (also by PRNet) and a set of triangles, defines a triangular mesh. The meshes estimated for each view are rendered and smoothened, face normals are calculated and the projected normals are rendered onto the respective camera view (technically, all operations may performed, for example, in Blender rendering engine). Then, the rendered normals are rotated by the camera rotation matrix for their conversion to the world space. The notation $N_1, \ldots, N_P$ is introduced for the estimated normal images for the facial part of size H×W. The normals predicted by the deep neural network are matched with the 3D face mesh reconstruction network (e.g. PRNet) normals at the facial region (defined by the mask $M_{face}$) by the normal loss:

$$L_{normal}(\phi,\mathcal{D})=\Delta(N(\phi,\mathcal{D})\cdot M_{face}, N_i\cdot M_{face}) \quad (12)$$

The composite (combined) loss may be expressed as follows:

$$L(\phi,\mathcal{D},C^{room},C^{flash},\mathcal{T}_A)=L_{final}(\phi,\mathcal{D},C^{room},C^{flash})+$$
$$\alpha_{normal}L_{normal}(\phi,\mathcal{D})+\alpha_{symm}L_{symm}(\phi,\mathcal{D},\mathcal{T}_A)+$$
$$\alpha_{cm}L_{cm}(\phi,\mathcal{D})+\alpha_{TV}L_{TV}(\phi,\mathcal{D})+\alpha_{mask}L_{mask}(\phi,\mathcal{D}) \quad (13)$$

Separate losses may be balanced, for example, as follows: $\alpha_{normal}=0.1$, $\alpha_{symm}=0.02$, $\alpha_{cm}=300$, $\alpha_{TV}=50$, $\alpha_{mask}=10^3$. Other balancing schemes are also possible, e.g. $\alpha_{normal}=0.1$, $\alpha_{symm}=0.02$, $\alpha_{cm}=100$, $\alpha_{TV}=50$, $\alpha_{mask}=10^3$.

The trainable part of the system is trained for one scene by the backpropagation of the loss to the rendering network parameters $\phi$, point descriptors D, and to the auxiliary parameters $C^{room}$, $C^{flash}$, $\mathcal{T}_A$. Adam with the same learning rate for $\phi$ and D may be used, while the rest of learnable parameters feature different learning rates, empirically selected according to the range of their possible values may be used. At each step, a sample training image is sampled, and a forward pass followed by the gradient step is made. Train-time augmentations may include random zoom in/out and subsequent cropping of a small patch.

Figure 5:
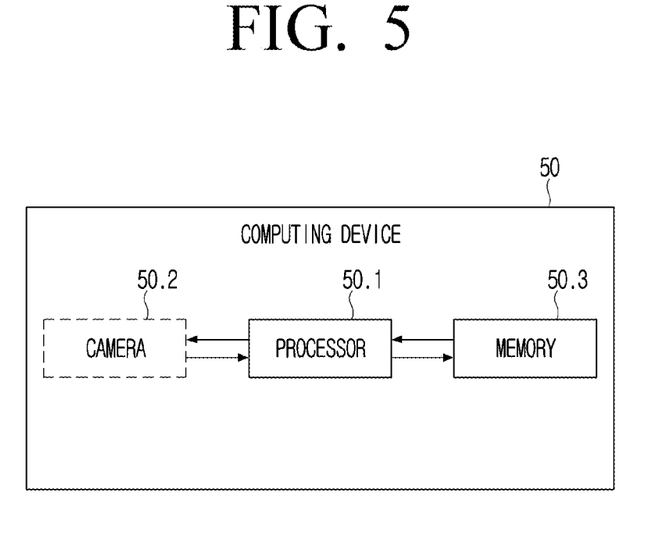
FIG. 5 is a block diagram illustrating an example configuration of an example computing device configured to render 3D portrait of a person according to various embodiments.

FIG. 5 is a block diagram illustrating an example configuration of a computing device 50 configured to render 3D portrait of a person according to various embodiments. The computing device 50 comprises processor (e.g., including processing circuitry) 50.1, camera 50.2 (camera 50.2 is optional; thus in FIG. 5 it is outlined with a dotted line), and memory 50.3 interconnected with each other. Illustration of interconnections between processor 50.1, camera 50.2, and memory 50.3 should not be construed as the limitation, because it is clear that processor 50.1, camera 50.2, and memory 50.3 may be interconnected differently. Camera 50.2 is configured to capture a sequence of images of a person using blinking flash. Memory 50.3 is configured to store processor-executable instructions instructing the computing device 50 to perform any step or substep of the disclosed method, as well as weights of the deep neural network, latent descriptors, and auxiliary parameters obtained during the training stage. The processor 50.1, upon execution of the processor-executable instructions, is configured to cause the computing device 50 to carry out the disclosed method for rendering a relighted 3D portrait of a person.

In an embodiment where the remote server is used for training the disclosed system and processing a sequence of images of a person, the computing device may further include a communication unit (not shown) including various communication circuitry configured to exchange data with a remote server. The data may include a request from the computing device to train the disclosed system and/or process a sequence of images of the person. The data for the remote server may also include the sequence of images captured with blinking flash by the computing device. The data from the remote server may include weights and other parameters of the trained system and/or the relighted 3D portrait of the person. Communication technologies of the communication unit may comprise any known communication technology, e.g. WiFi, WiMax, 4G (LTE), 5G and so on. Communication unit is interconnected with other components of the computing device or may be integrated with the processor (e.g. as SoC).

The computing device 50 may comprise other, not shown components, for example, a screen, a camera, a communication unit (e.g., including communication circuitry), a touch-sensitive panel, keypad, keyboard, one or more buttons, a speaker, a microphone, a Bluetooth module, an NFC module, a RF module, a Wi-Fi module, a power supply and so on, and corresponding interconnections. The disclosed method for rendering a relighted 3D portrait of a person may be implemented on a wide range of computing devices 50, such as, for example, and without limitation, VR smart glasses, AR smart Masses, 3D displaying systems, smartphones, tablets, laptops, mobile robots and navigation systems, or the like. The implementation of the method supports all kinds of devices capable of performing calculations on CPU. Additionally, the computing device 50 may comprise additional components for speeding up the neural network and rasterization, such as, for example, and without limitation, a GPU (graphics processing unit), NPU (neural processing unit), TPU (tensor data processing unit), or the like. OpenGL may be applied for implementation of the rasterization. If such additional components are included, faster and more effective implementation and performance of the disclosed method (including the training stage) is possible on such devices. In non-limiting embodiments the processor 50.1 may implemented including, but not limited to, a general-purpose processor, an application-specific integrated circuit (ASIC), a user-programmable gate array (FPGA), or a system-on-chip (SoC), etc.

At least one of the plurality of modules, blocks, components, steps, sub-steps may be implemented through an AI model. One or more steps or substeps of the disclosed method may be implemented as units/modules (e.g., as hardware components) of the computing device 50. A function associated with AI may be performed through the memory 50.3 that may include non-volatile memory and the volatile memory, and the processor 50.1. The processor 50.1 may include one or a plurality of processors. One or a plurality of processors may comprise a general-purpose processor, such as, for example, and without limitation, a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Being provided through learning may refer to, by applying a learning algorithm to a plurality of learning data, a predefined operating rule or AI model of a desired characteristic being made. The learning may be performed in a device itself in which AI according to an embodiment is performed, and/or may be implemented through a separate server/system.

The AI model may include a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. The learning algorithm is a method for training a predetermined target computing device 50 using a plurality of learning data to cause, allow, or control the target computing device 50 to make a determination, estimation, or prediction. Examples of learning algorithms include, but are not limited to, supervised learning, unsupervised learning, semi-supervised learning, or reinforcement learning.

Modifications and improvements to the above-described implementations of the various embodiments may become apparent to those skilled in the art. For example, particular parameter values specified in the above disclosure are not to be construed as the limitation, since values of parameters may be selected experimentally from appropriate ranges, for example +/−10-50% from the specified particular parameter values. The foregoing description is intended to be an example rather than limiting.

While the disclosure has been illustrated and described with reference to various example embodiments, it will be understood that the various operations may be combined, sub-divided, or reordered without departing from the teachings of the disclosure. Accordingly, an order and grouping of the operations is not a limitation of the disclosure. The use of the singular form in relation to any element disclosed in this application does not preclude that two or more such elements may be in an actual implementation.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A method for rendering a relighted 3D portrait, the method comprising:
    capturing a sequence of frames by a camera with a blinking flash while moving the camera around a person;
    generating a 3D point cloud based on the sequence of frames;
    receiving an input defining a camera viewpoint and lighting conditions;
    obtaining feature information regarding the 3D point cloud for the camera viewpoint;
    obtaining, via a neural network, at least one 2D image for the camera viewpoint based on the feature information; and
    fusing the at least one 2D image into the relighted 3D portrait according to the lighting conditions.

2. The method of claim 1, wherein the at least one 2D image includes albedo map, normal map, environmental lighting map, and segmentation mask.

3. The method of claim 2, wherein the obtaining feature information comprises obtaining rasterized images based on the feature information, and
    wherein the obtaining the at least one 2D image comprises processing the rasterized images with the neural network to the albedo map, the normal map, the environmental lighting map, and the segmentation mask for the camera viewpoint.

4. The method of claim 3, wherein the 3D point cloud is generated based on the sequence of images captured by the camera while moving the camera around an upper body of the person.

5. The method of claim 4, wherein the sequence of images comprising a set of flash images and a set of no-flash images.

6. The method of claim 1, wherein the generating the 3D point cloud further comprises estimating camera viewpoints with which the sequence of images is captured.

7. The method of claim 6, wherein the received camera viewpoint and the lighting conditions differ from camera viewpoints and lighting conditions with which the sequence of images is captured.

8. The method of claim 6, wherein the generating the 3D point cloud and the estimating camera viewpoints are performed using Structure-from-Motion (SfM), wherein the 3D point cloud comprises points corresponding to an upper body.

9. The method of claim 1, wherein the generating the 3D point cloud further comprises:
processing each image of the sequence by segmenting a foreground; and
filtering the 3D point cloud based on the segmented foreground by a segmentation neural network to obtain the filtered 3D point cloud.

10. The method of claim 1, wherein the obtaining feature information is performed using Z-buffering.

11. The method of claim 5, wherein flash images of the set of flash images are alternated with no-flash images of the set of no-flash images in said sequence of images.

12. The method of claim 1, wherein the obtaining feature information comprises rasterizing latent descriptors of the 3D point cloud at different resolutions according to the camera viewpoint, and
wherein the latent descriptor includes a multi-dimensional latent vector characterizing properties of a corresponding point in the 3D point cloud.

13. The method of claim 1, wherein the method further comprises training the neural network, and
wherein the training the neural network comprises:
randomly sampling an image from the captured sequence of images, the camera viewpoint corresponding to the image, and
obtaining a predicted image by the neural network for the camera viewpoint, wherein the training stage is carried out iteratively.

14. The method of claim 13, wherein the neural network is trained by backpropagation of a loss to weights of the neural network, latent descriptors, and auxiliary parameters,
wherein the loss is calculated based on one or more of: main loss, segmentation loss, room shading loss, symmetry loss, albedo color matching loss, normal loss.

15. The method of claim 14, wherein the auxiliary parameters include one or more of room lighting color temperature, flashlight color temperature, and albedo half-texture.

16. The method of claim 15, further comprising predicting auxiliary face meshes with corresponding texture mapping by a 3D face mesh reconstruction network for each of the images in the captured sequence,
wherein the corresponding texture mapping includes a specification of two-dimensional coordinates in the fixed, predefined texture space for every vertex of the mesh.

17. The method of claim 14, wherein the main loss is calculated as a mismatch between predicted image and the sampled image by a combination of non-perceptual and perceptual loss functions.

18. The method of claim 14, wherein the segmentation loss is calculated as a mismatch between a predicted segmentation mask and a segmented foreground of an image of the sequence of frames.

19. The method of claim 14, wherein the room shading loss is calculated as a penalty for a sharpness of predicted environmental shadow maps, wherein the penalty increases as the sharpness increases.

20. A computer-readable non-transitory storage medium having stored therein instructions that, when executed, cause the electronic device to perform the method of claim 1.

* * * * *